(12) United States Patent
Doty et al.

(10) Patent No.: US 9,321,241 B2
(45) Date of Patent: Apr. 26, 2016

(54) VENTILATED AERO-STRUCTURES, AIRCRAFT AND ASSOCIATED METHODS

(75) Inventors: Robert E. Doty, Los Angeles, CA (US); Richard W. Burns, Edwardsville, IL (US); Alan Jon Jacobsen, Woodland Hills, CA (US); Sophia Shu Yang, Los Angeles, CA (US)

(73) Assignee: The Boeing Company, Chicago, IL (US)

(*) Notice: Subject to any disclaimer, the term of this patent is extended or adjusted under 35 U.S.C. 154(b) by 919 days.

(21) Appl. No.: 13/469,913

(22) Filed: May 11, 2012

(65) Prior Publication Data
US 2013/0303067 A1 Nov. 14, 2013

(51) Int. Cl.
F24F 7/00 (2006.01)
B32B 3/12 (2006.01)
B32B 3/28 (2006.01)
B64C 1/06 (2006.01)

(52) U.S. Cl.
CPC ... *B32B 3/12* (2013.01); *B32B 3/28* (2013.01); *B64C 1/06* (2013.01); *B32B 2305/024* (2013.01); *B32B 2305/38* (2013.01); *B32B 2307/724* (2013.01); *B32B 2605/18* (2013.01); *Y10T 156/10* (2015.01); *Y10T 156/1002* (2015.01)

(58) Field of Classification Search
CPC ........ B32B 2305/38; B32B 3/12; B32B 3/28; B32B 2307/724; B32B 2605/18; B32B 2305/024; B64C 1/06; Y10T 156/10; Y10T 156/1002
USPC ........... 454/76, 284; 244/123.1, 123.3, 123.4, 244/123.6, 117 A, 200; 428/315.5; 156/60, 156/196

See application file for complete search history.

(56) References Cited

U.S. PATENT DOCUMENTS

| | | | | |
|---|---|---|---|---|
| 3,261,576 | A * | 7/1966 | Valyi | 244/130 |
| 4,671,841 | A * | 6/1987 | Stephens | 156/292 |
| 4,749,150 | A * | 6/1988 | Rose et al. | 244/53 B |
| 4,990,391 | A * | 2/1991 | Veta et al. | 428/116 |
| 5,721,402 | A * | 2/1998 | Parente | 181/214 |
| 6,179,086 | B1 * | 1/2001 | Bansemir et al. | 181/292 |
| 7,005,175 | B2 * | 2/2006 | Hachenberg et al. | 428/75 |
| 7,382,959 | B1 | 6/2008 | Jacobsen | |
| 7,653,279 | B1 | 1/2010 | Jacobsen | |
| 8,534,418 | B2 * | 9/2013 | Pachale | 181/292 |
| 2009/0039200 | A1 * | 2/2009 | Marx et al. | 244/134 E |
| 2009/0173571 | A1 * | 7/2009 | Keller | 181/292 |
| 2010/0038051 | A1 * | 2/2010 | Behrens et al. | 165/41 |
| 2010/0108814 | A1 | 5/2010 | Etling | |

(Continued)

OTHER PUBLICATIONS

English abstract for DE3720371 obtained from espacenet.com.

(Continued)

*Primary Examiner* — Gregory Huson
*Assistant Examiner* — Dana Tighe
(74) *Attorney, Agent, or Firm* — DASCENZO Intellectual Property Law, P.C.

(57) ABSTRACT

Ventilated aero-structures include a micro-lattice structure operatively coupled to a honeycomb core. The interface between the honeycomb core and the micro-lattice structure is configured to permit air flow to and from the honeycomb core via the micro-lattice structure. Aircraft include a ventilated aero-structure and a ventilation system configured to circulate air through the ventilated aero-structure. Some methods include coupling a micro-lattice structure to a honeycomb core. Some methods include utilizing a ventilated aero-structure to assemble an aircraft.

14 Claims, 5 Drawing Sheets

(56) References Cited

U.S. PATENT DOCUMENTS

2010/0291466 A1 11/2010 Rock et al.
2010/0300669 A1 12/2010 Jacobsen et al.
2013/0037346 A1 2/2013 Pachale

OTHER PUBLICATIONS

Machine-generated English translation of abstract for DE102010015638 obtained from espacenet.com.
Davis et al., "Honeycomb Bond and Core Durability Issues; Experiences Within CREDP Nations," Aging Aircraft Conference, Williamsberg, VA, Aug. 31-Sep. 2, 1998.
Li et al., "Investigation of an Accelerated Moisture Removal Approach of a Composite Aircraft Control Surface," National Research Council Canada, University of Ottawa, Department of National Defense Canada, 2006.
U.S. Appl. No. 11/801,908, filed May 10, 2007, Jacobsen et al.
U.S. Appl. No. 12/757,965, filed Apr. 9, 2010, Doty et al.
U.S. Appl. No. 13/428,348, filed Mar. 23, 2012, Kolodziejska et al.
U.S. Appl. No. 13/437,853, filed Apr. 2, 2012, Jacobsen et al.

* cited by examiner

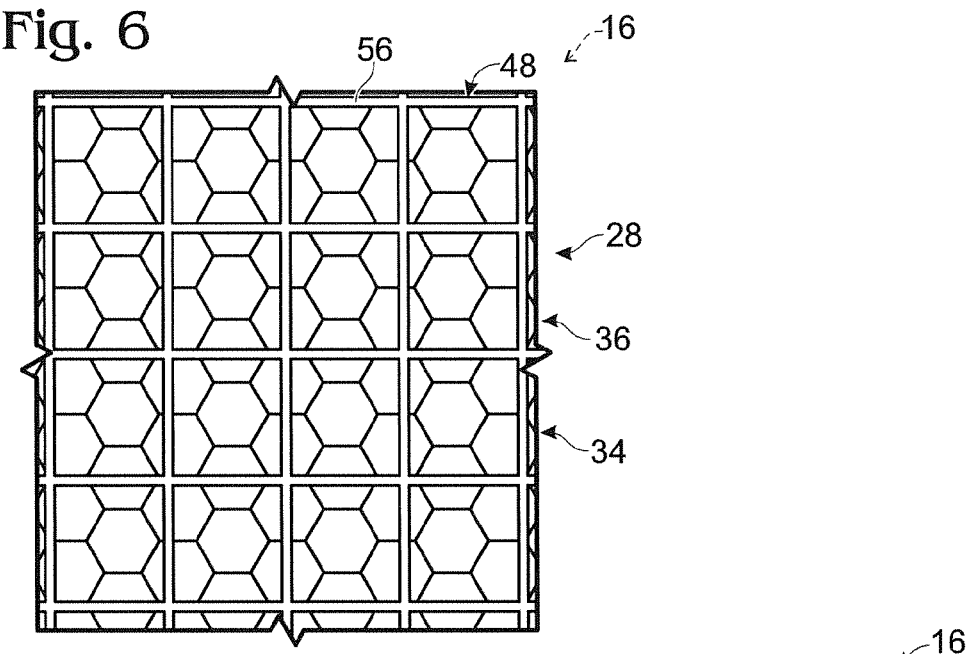
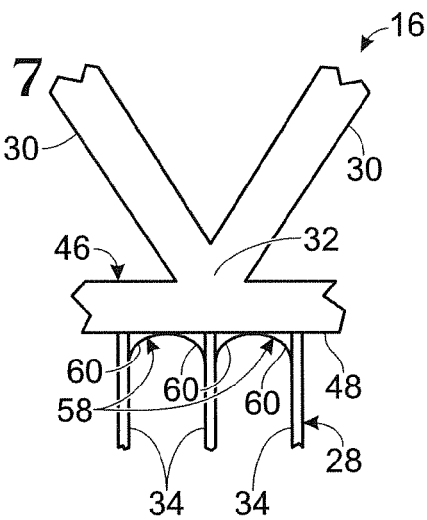
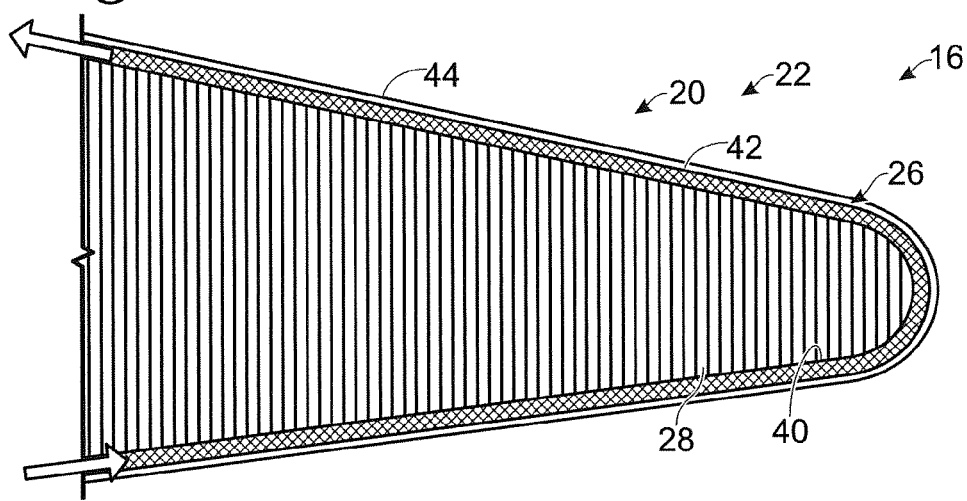

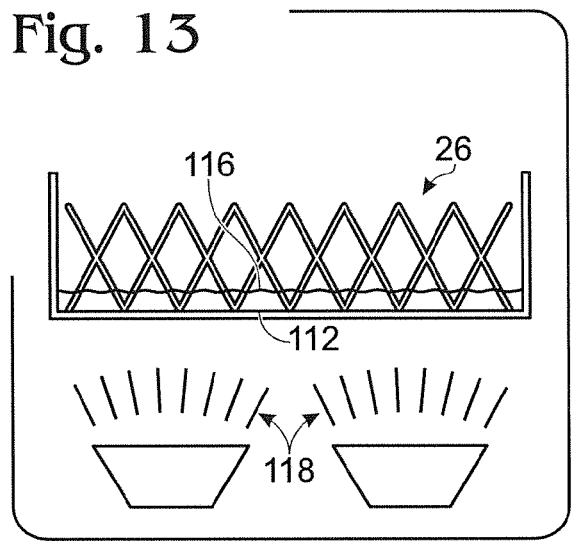
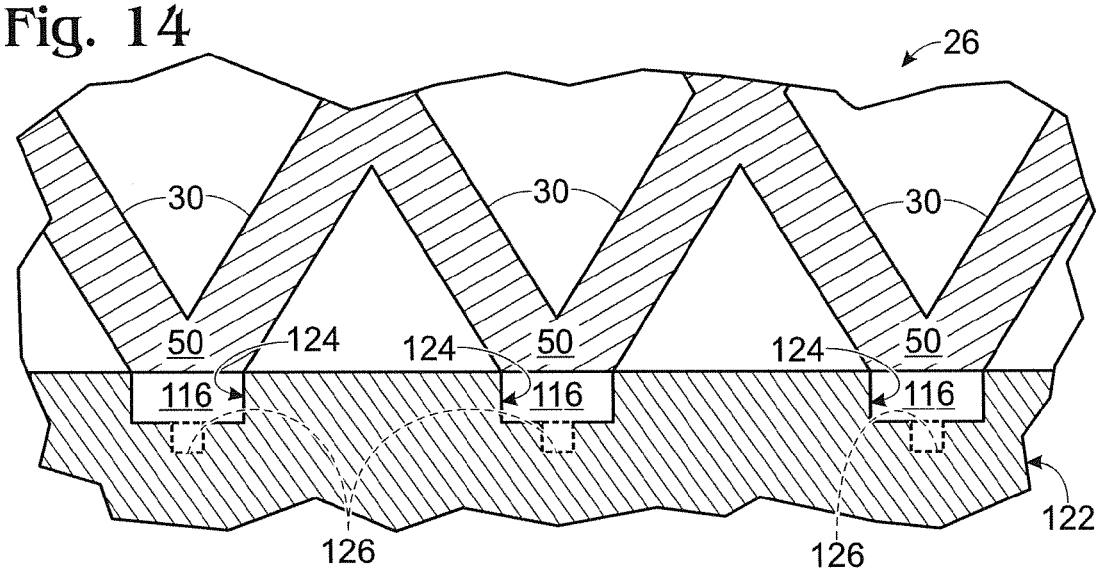

VENTILATED AERO-STRUCTURES, AIRCRAFT AND ASSOCIATED METHODS

FIELD

The present disclosure relates to ventilated aero-structures.

BACKGROUND

Honeycomb structures are often used in the construction of aircraft, because they typically have high strength to weight ratios. Typically, honeycomb structures are sandwiched and bonded between opposing panels, or face-sheets, resulting in closed volumes of air within the cells of the honeycomb structures. Closed cells are susceptible to collecting moisture and do not permit airflow for venting, cooling, or heating applications. Moisture ingress may contribute to failure of the bond between the honeycomb structure and adjacent panels, as well as separation and degradation of cells of the honeycomb structure. Unvented honeycomb structures may be difficult to process in autoclave bonding operations, which use gas pressure and/or vacuum to apply forces to the structure to achieve bonding, because pressures can build and collapse the honeycomb structure.

SUMMARY

Ventilated aero-structures according to the present disclosure include a micro-lattice structure and a honeycomb core operatively coupled to at least one side of the micro-lattice structure. The interface between the honeycomb core and the micro-lattice structure is configured to permit air flow to and from the honeycomb core via the micro-lattice structure. Aircraft according to the present disclosure include a ventilated aero-structure and a ventilation system configured to circulate air through the ventilated aero-structure.

Methods of constructing ventilated aero-structures according to the present disclosure include coupling a micro-lattice structure to a honeycomb core. Methods of assembling aircraft according to the present disclosure include utilizing a ventilated aero-structure to define a portion of the aircraft's airframe.

BRIEF DESCRIPTION OF THE DRAWINGS

FIG. 6 is a schematic plan view illustrating an interface between an adherence grid and a honeycomb core structure.

FIG. 7 is a schematic side view illustrating an interface between an adherence grid and a honeycomb core structure.

FIG. 8 is a schematic cross-sectional side view representing illustrative, non-exclusive examples of aero-structures according to the present disclosure that define a leading edge of an airfoil.

FIG. 13 is a schematic side view representing a curing step of methods according to the present disclosure.

FIG. 14 is a schematic side view representing illustrative, non-exclusive examples of molds that may be used to form an adherence structure on a micro-lattice structure.

DESCRIPTION

Figure 1:
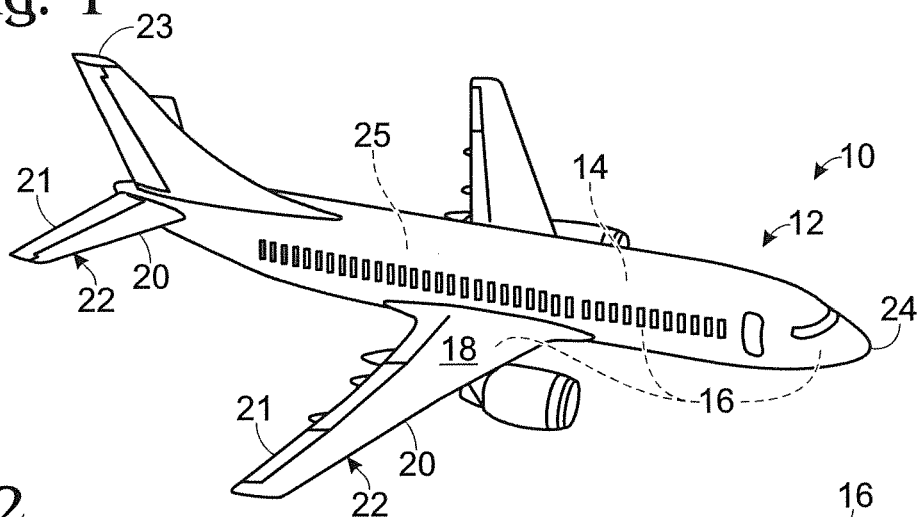
FIG. 1 is an isometric view of an aircraft.

Ventilated aero-structures, aircraft with ventilated aero-structures, methods of constructing ventilated aero-structures, and methods of assembling aircraft are disclosed herein. In FIG. 1 an example of an aircraft 10 is generically and generally schematically illustrated. Aircraft 10 according to the present disclosure may take any suitable form, including commercial aircraft, military aircraft, or any other suitable aircraft. While FIG. 1 illustrates aircraft 10 in the form of a fixed wing aircraft, other types and configurations of aircraft are within the scope of aircraft 10 according to the present disclosure, including (but not limited to) helicopters and missiles. An aircraft 10 includes an airframe 12 and a ventilation system 14 that is supported by the airframe 12. Airframe 12 includes one or more ventilated aero-structures 16, and the ventilation system 14 is configured to circulate air through the ventilated aero-structures 16, for example, for controlling moisture within the airframe 12, for de-icing external surfaces 18 of the aircraft 10, or for any other suitable purpose for which circulated air through the airframe 12 is desirable. As illustrative-non exclusive examples, a ventilated aero-structure 16 may be utilized in the construction of the leading edge 20 and/or the trailing edge 21 of an airfoil 22, the vertical stabilizer 23 of the aircraft 10, the nose 24 of the aircraft 10, and/or the internal floors 25 of the aircraft 10; however, other portions of an airframe 12 and aircraft 10 also may include ventilated aero-structures 16 according to the present disclosure, such as (but not limited to) flaps, elevators, and fairings.

Figure 2:
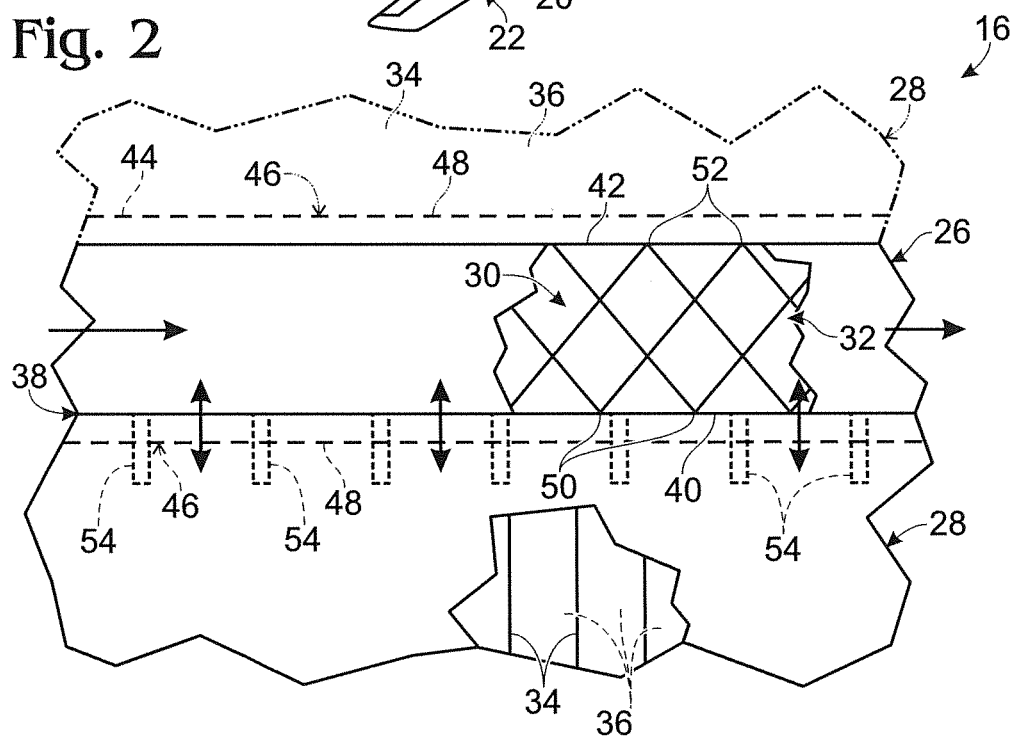
FIG. 2 is a schematic diagram representing ventilated aero-structures according to the present disclosure.

As schematically illustrated in FIG. 2, ventilated aero-structures 16 include a micro-lattice structure 26 and a honeycomb core 28 that is operatively coupled to the micro-lattice structure 26. A micro-lattice structure 26 may take any suitable form and typically includes a plurality of truss elements 30 that define a plurality of nodes 32 at the intersections of two or more trusses 30. Micro-lattice structure 26 additionally or alternatively may be described as micro-truss structures 26, and truss elements 30 additionally or alternatively may be described as truss elements 30 or struts 30. The representation of truss elements 30 and nodes 32 in FIG. 2 are schematic in nature and do not limit micro-lattice structures 26 to the schematically illustrated configuration.

Micro-lattice structures 26 have an ordered, open-cellular structure, and may be constructed of any suitable material, with polymers being illustrative examples of suitable materials. In some examples, micro-lattice structures 26 may be created by an optical process that forms a three-dimensional pattern of intersecting waveguides in a volume of UV-curable monomer. Illustrative, non-exclusive examples of micro-lattice structures 26 that may be used to construct ventilated aero-structures 16 are disclosed in U.S. Pat. Nos. 7,382,959 and 7,653,279, U.S. Patent Application Publication Nos.

2010/0291466 and 2010/0300669, and U.S. patent application Ser. Nos. 11/801,908 and 12/757,965, the disclosures of which are incorporated herein by reference.

As an illustrative, non-exclusive example, a micro-lattice structure 26 may be constructed utilizing a truss diameter and node spacing defined by a photo-mask with approximately 1.6 millimeter (mm) diameter apertures at diagonal spacing of approximately 8 mm. The truss elements 30 may be formed at an inclination angle of approximately 58 degrees, resulting in a thickness of a single row of truss elements 30 of approximately 6.4 mm. Other configurations and constructions of micro-lattice structures 26 also may be used and are within the scope of the present disclosure. Typical applications of ventilated aero-structures 16 may incorporate micro-lattice structures 26 having a thickness of approximately ⅛ to 1 inch (3-25 mm); however, thicknesses less than and greater than this range may be used to construct ventilated aero-structures 16 according to the present disclosure.

Honeycomb core 28 may take any suitable form and may be constructed of any suitable material, with polymers, aluminum alloys, and carbon composite materials being illustrative examples of suitable materials. Honeycomb cores 28 include a plurality of walls 34 that define a plurality of elongate cells 36. As an illustrative, non-exclusive a honeycomb core 28 may be defined by a plurality of elongate cells 36 that are hexagonal in cross-section with a cell size of approximately ⅛ inch (3.2 mm); however, other configurations of honeycomb core 28 are within the scope of the present disclosure and are utilized in the aerospace industry for the construction of airframes, including cell sizes of 3/16 inch (4.8 mm) and ¼ inch (6.4 mm).

As schematically illustrated with arrows in FIG. 2, the interface 38 between the honeycomb core 28 and the micro-lattice structure 26 are configured to permit air flow to and from the honeycomb core 28 via the micro-lattice structure 26. Accordingly, and as mentioned, ventilated aero-structures 16 may be used in combination with a ventilation system 14 for controlled circulation of air through airframe 12.

Micro-lattice structure 26 may be described as having a first side 40 and a second side 42. In some embodiments, the honeycomb core 28 may be operatively coupled to the first side 40 of the micro-lattice structure 26, and ventilated aero-structure 16 may further include a skin 44 operatively coupled to the second side 42 of micro-lattice structure 26, as illustrated optionally in dashed lines in FIG. 2. The skin 44 may at least partially define outer surface 18 of an aircraft 10. In other embodiments, the honeycomb core 28, or a separate and distinct honeycomb core 28, may be operatively coupled to the second side 42 of the micro-lattice structure 26, as illustrated optionally in dash-dot-dot lines in FIG. 2. Such embodiments may be described as having a micro-lattice structure 26 that extends within or through a honeycomb structure 28 or that extends between two honeycomb structures 28. Other configurations also are within the scope of the present disclosure, and broadly, a ventilated aero-structure 16 according to the present disclosure includes at least one micro-lattice structure 26 operatively coupled to at least one honeycomb core 28.

When present, skin 44 may be adhered to one of the honeycomb core 28 or the micro-lattice structure 26, depending on the configuration of ventilated aero-structure 16, for example, by an adhesive. Illustrative, non-exclusive examples of suitable adhesives include (but are not limited to) room temperature vulcanization (RTV) silicones and epoxies.

As schematically and optionally illustrated in dashed lines in FIG. 2, some embodiments of ventilated aero-structures 16 further include an adherence structure 46 formed on the first side 40 of the micro-lattice structure 26, with the adherence structure 46 defining an adherence surface 48 that is adhered to the honeycomb core 28, for example, by an adhesive. Illustrative, non-exclusive examples of suitable adhesives include (but are not limited to) room temperature vulcanization (RTV) silicones and epoxies.

In some embodiments, adherence surface 48 may be generally planar and thus provide an increased surface area for adhering the micro-lattice structure 26 to the honeycomb core 28 than otherwise would be present without an adherence structure 46. Moreover, by having a generally planar adherence surface 48, the nodes 32 of the micro-lattice structure 26 may be restricted from penetrating the cells 36 of the honeycomb core 28, which could lead to unpredictable and uncontrolled contact between the micro-lattice structure 26 and the honeycomb core 28.

Additionally or alternatively, the adherence structure 46, when present, may be described as a portion of the micro-lattice structure 26. In some such embodiments, the adherence structure 46 may be formed integrally with the micro-lattice structure 26. Additionally or alternatively, the adherence structure 46 may be formed on the first side 40 of the micro-lattice structure 26 utilizing an optical process that forms the adherence structure 46 from a volume of UV-curable monomer. In some embodiments, depending on the configuration of the micro-lattice structure 26 and the adherence structure 46, the adherence structure 46 may have a thickness of approximately 0.01-0.03 inch (0.25-0.76 mm). In some embodiments, the thickness of the adherence structure 46 may be approximately equal to or less than the approximate thickness of a node 32. In some embodiments, it may be desirable for the thickness of the adherence structure 46 to be equal to or less than the thickness of a node 32, so that the adherence structure 46 will not restrict airflow through the micro-lattice structure 26 to and from the honeycomb core 28.

Additionally or alternatively, in examples of ventilated aero-structures 16 that include a honeycomb core 28 on the first side 40 and the second side 42, the ventilated aero-structure 16 may include a second adherence structure 46 formed on the second side 42 of the micro-lattice structure 26, as schematically and optionally indicated with the dash-dot-dot lead lines in FIG. 2.

The plurality of nodes 32 of micro-lattice structure 26 may include a subset of nodes 32 that coincide with the first side 40 of the micro-lattice structure 26, with this subset of nodes 32 being referred to as first-side nodes 50. Stated differently, the first-side nodes 50 may coincide generally with the interface 38 between the honeycomb core 28 and the micro-lattice structure 26. Additionally or alternatively, the plurality of nodes 32 may include a subset of nodes 32 that coincide with the second side 42 of the micro-lattice structure 26, with this subset of nodes 32 being referred to as second-side nodes 52.

In embodiments of ventilated aero-structures 16 that include an adherence structure 46 on the first side 40 of the micro-lattice structure 26, the adherence structure 46 may (but is not required to) interconnect at least a subset of the first-side nodes 50. As an illustrative, non-exclusive example, the adherence surface 48 may define a grid that interconnects the first-side nodes 50. Additionally or alternatively, the adherence surface 48 may define a plurality of spaced-apart surfaces, with each of the spaced-apart surfaces interconnecting a subset of the plurality of first-side nodes 50. An illustrative, non-exclusive example of such a configuration includes an adherence surface 48 that defines a plurality of spaced-apart elongate strips, with each strip interconnecting a subset of the first-side nodes 50. Other configurations also are within the scope of the present disclosure.

In embodiments of ventilated aero-structures 16 that include a second adherence structure 46 on the second side 42 of the micro-lattice structure 26, the second adherence structure 46 may interconnect at least a subset of the second-side nodes 52. Similar to the adherence structure 46 on the first side 40 of the micro-lattice structure 26, the second adherence surface 48 may define a grid or a plurality of spaced apart surfaces that interconnect the second-side nodes 52.

In embodiments of ventilated aero-structures 16 that include nodes 32 that align with the adherence structure 46, mechanical loads between the micro-lattice structure 26 and the honeycomb core 28 may be transferred efficiently along the truss elements 30.

Additionally or alternatively, in some embodiments of ventilated aero-structures 16, an adherence structure 46 may interconnect a subset of the truss elements 30 at positions that are spaced away from the first-side nodes 50 and/or the second-side nodes 52. For example, in some embodiments, the spacing of the grid and/or spaced apart surfaces of an adherence structure 46 may be selected to correspond to the size of honeycomb core 28 being utilized, in which case the spacing of the grid and/or spaced apart surfaces may not correspond to and/or align with nodes 32. Additionally or alternatively, in some embodiments, portions of an adherence structure 46 may align with a subset of nodes 32 and other portions of the adherence structure 46 may not align with a subset of nodes 32.

Figure 3:
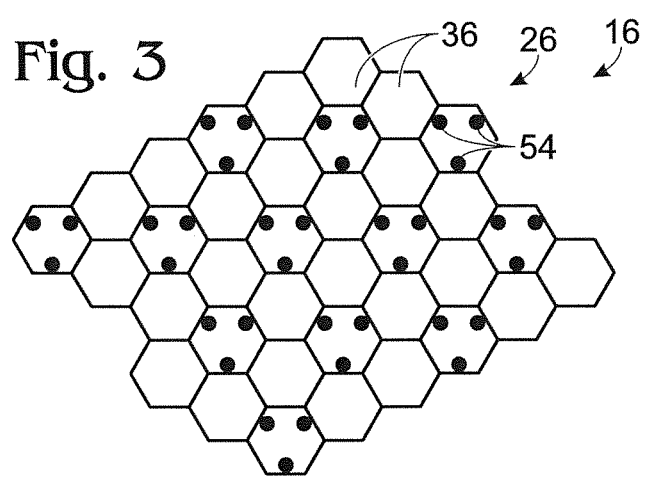
FIG. 3 is a schematic plan view representing an illustrative, non-exclusive example of a ventilated aero-structure that includes a series of spaced-apart projections.

In addition to or as an alternative to inclusion of the adherence structure 46, a ventilated aero-structure 16 may include a plurality of spaced-apart projections 54 that extend from the micro-lattice structure 26 into the honeycomb core 28. Projections 54 additionally or alternatively may be described as posts 54 or studs 54. In some embodiments, although not required, the projections 54 may be integral to the micro-lattice structure 26. In some such embodiments, the projections 54 may be integrally formed as part of the micro-lattice structure 26, such as utilizing an optical process that forms the micro-lattice structure 26 from a volume of UV-curable monomer. In some embodiments, the projections 54 may have cross-sectional profiles that correspond to and are sized to mate with the cells 36 of the honeycomb core 28. Additionally or alternatively, the projections 54 may be integral to the adherence structure 46 and/or may be described as parts of the adherence structure 46. Additionally or alternatively, a series of two or more projections 54 may be positioned to engage the inside surfaces of respective cells 36 of the honeycomb core 28. FIG. 3 schematically illustrates an illustrative, non-exclusive example of a series of three projections 54 that are positioned to engage the inside surface of respective cells 36 of the honeycomb core 28. Series of two, three, four, five, six, or more than six projections 54 also may be used and are within the scope of the present disclosure, and as mentioned, projections 54 are optional, and a ventilated aero-structure 16 may not include any projections 54.

Examples of micro-lattice structures with integral projections are disclosed in U.S. patent application Ser. No. 13/437,853, entitled "STRUCTURAL SANDWICH CORE MATERIALS FOR COMPRESSION AND SHEAR RESISTANCE" and filed on Apr. 2, 2012 (hereby incorporated by reference), and may be used and/or modified for use as a micro-lattice structure 26 of a ventilated aero-structure 16. Inclusion of projections 54 may provide additional structure for adhering, or otherwise securing, the micro-lattice structure 26 to the honeycomb core 28 during assembly of a ventilated aero-structure 16.

Turning now to FIGS. 4-9, illustrative non-exclusive examples of ventilated aero-structures 16 and portions thereof are illustrated. Where appropriate, the reference numerals from the schematic illustration of FIG. 2 are used to designate corresponding parts; however, the examples of FIGS. 4-9 are non-exclusive and do not limit ventilated aero-structures 16 to the illustrated embodiments of FIGS. 4-9. That is, ventilated aero-structures 16 may incorporate any number of the various aspects, configurations, characteristics, properties, etc. of ventilated aero-structures 16 that are illustrated in and discussed with reference to the schematic representations of FIG. 2 and/or the embodiments of FIGS. 4-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the embodiments of FIGS. 4-9; however, it is within the scope of the present disclosure that the previously discussed features, variants, etc. may be utilized with any embodiments.

Figure 4:
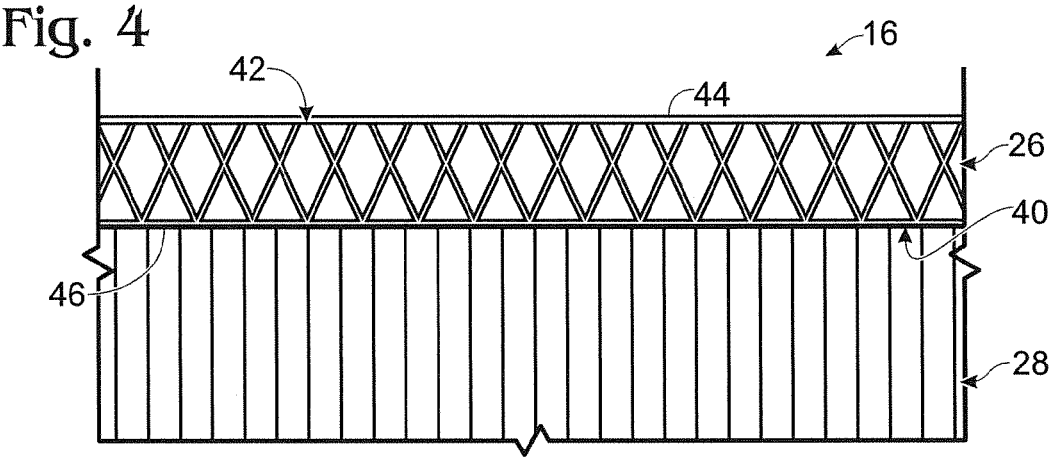
FIG. 4 is an isometric view of a portion of an illustrative, non-exclusive example of an aero-structure according to the present disclosure.

FIG. 4 illustrates a portion of an illustrative, non-exclusive example of a ventilated aero-structure 16 that includes a skin 44 operatively coupled to the second side 42 of the micro-lattice structure 26 and a honeycomb core 28 operatively coupled to the first side 40 of the micro-lattice structure 26. The illustrated ventilated aero-structure 16 of FIG. 4 includes an adherence structure 46 on the first side 40 of the micro-lattice structure 26.

Figure 5:
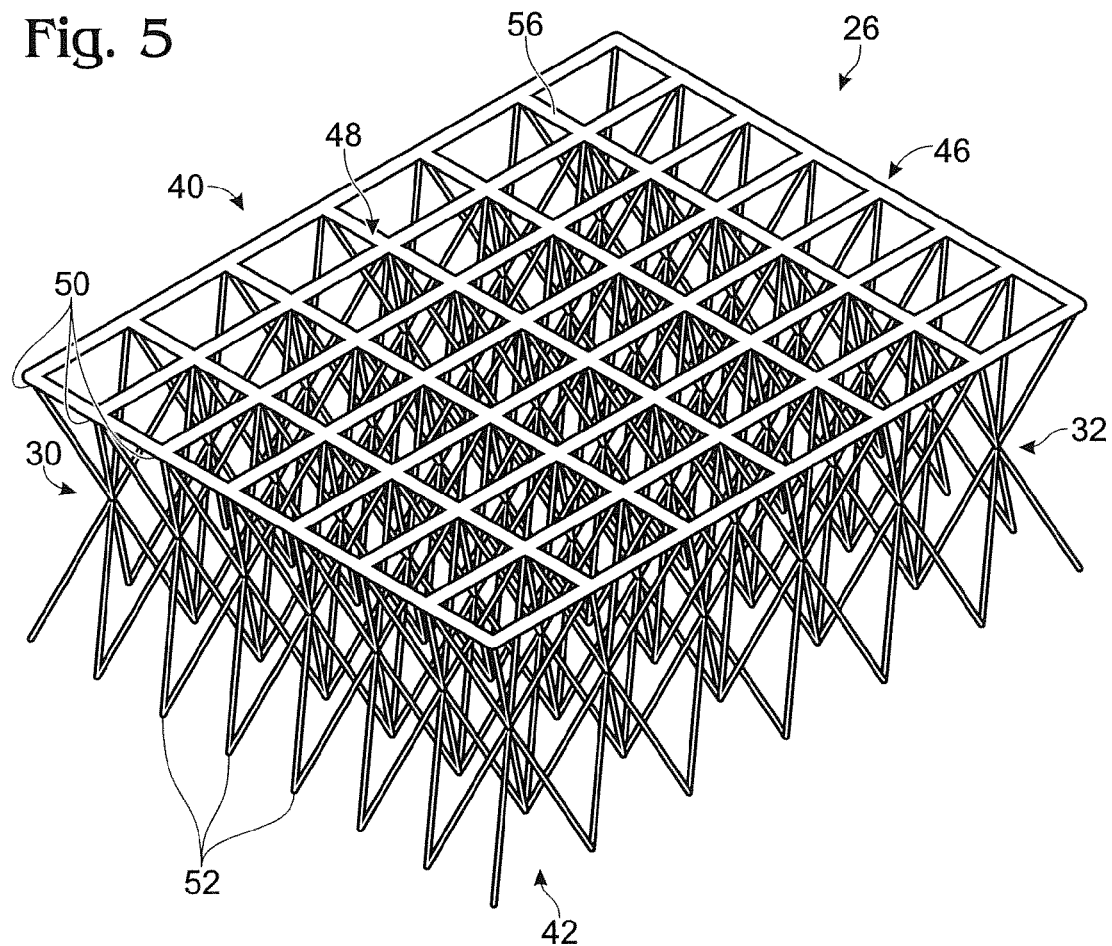
FIG. 5 is an isometric view of a micro-lattice structure with an adherence grid.

FIG. 5 illustrates a portion of an illustrative, non-exclusive example of a micro-lattice structure 26 and an illustrative, non-exclusive example of an adherence structure 46 formed on the first side 40 of the micro-lattice structure 26. The illustrated example of micro-lattice structure 26 includes trusses 30 that intersect to define first-side nodes 50 and second-side nodes 52. The illustrated example of adherence structure 46 includes an adherence surface 48 that defines a grid 56 interconnecting the first-side nodes 50.

FIG. 6 schematically illustrates in profile the interface between an adherence surface 48 in the form of a grid 56 and a honeycomb core 28 having hexagonal cells 36. Assuming that a node 32 of a micro-lattice structure 26 coincides with each intersection of the grid 56, a total of 65 points of contact between the adherence surface 48 and the walls 34 of the schematically represented honeycomb core 28 are present and may be utilized for adhering the adherence structure 46 to the honeycomb core 28. In contrast, if the adherence structure 46 were not present, only approximately 25 nodes 32 would coincide with and contact a wall 34 of the honeycomb structure 28.

If the example of FIG. 6 represents a ¼ inch (6.4 mm) spacing of the grid 56 and first-side nodes 50 and ⅛ inch (3.2 mm) hexagonal cells 36, a resulting ventilated aero-structure 16 would include approximately 7200 points of contact per square foot (0.09 square meter) between the adherence surface 48 and the walls 34 of the honeycomb core 28.

FIG. 7 illustrates in side profile the interface between an adherence structure 46 and honeycomb core 28. As illustrated, the adhesive 58 forms fillets 60 between the adherence surface 48 and the walls 34 of the honeycomb core 28.

FIG. 8 illustrates an illustrative, non-exclusive example of a ventilated aero-structure 16 that defines a leading edge 20 of an airfoil 22. The example ventilated aero-structure 16 of FIG. 8 includes a honeycomb core 28 operatively coupled to the first side 40 of the micro-lattice structure 26 and a skin 44 operatively coupled to the second side 42 of the micro-lattice structure 26.

Figure 9:
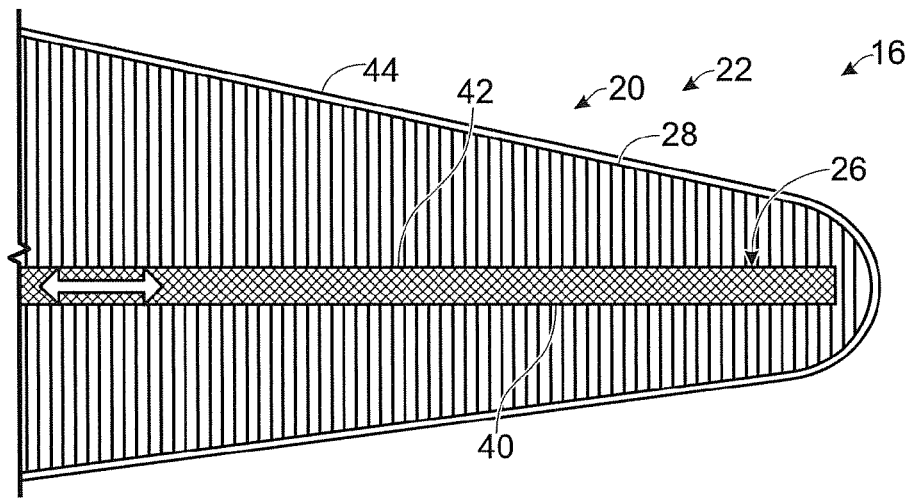
FIG. 9 is another schematic cross-section side view representing illustrative, non-exclusive examples of aero-structures according to the present disclosure that define a leading edge of an airfoil.

FIG. 9 illustrates another illustrative, non-exclusive example of a ventilated aero-structure 16 that defines a leading edge 20 of an airfoil 22. The example ventilated aero-structure 16 of FIG. 9 includes a micro-lattice structure 26 that extends within a honeycomb core 28, with the honeycomb core 28 being operatively coupled to the first side 40 and the second side 42 of the micro-lattice structure 26. In the example of FIG. 9, the skin 44 is operatively coupled to the honeycomb core 28 and is not coupled directly to the micro-lattice structure 26.

Figure 10:
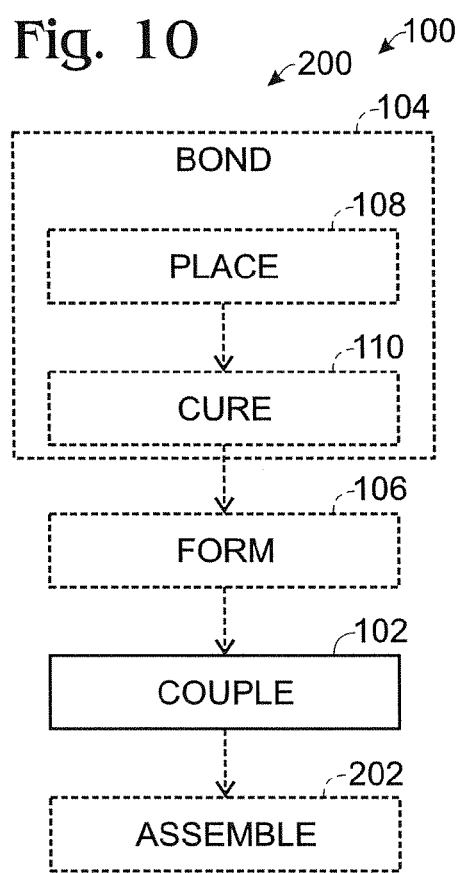
FIG. 10 is a flow-chart schematically representing illustrative non-exclusive examples of methods according to the present disclosure.

FIG. 10 schematically provides a flowchart that represents illustrative, non-exclusive examples of methods according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

FIG. 10 schematically represents illustrative, non-exclusive examples of methods 100 of constructing a ventilated aero-structure 16. As illustrated in solid boxes, a method 100 may include at least the step of operatively coupling a micro-lattice structure 26 to a honeycomb core 28, as indicated at 102. In some methods 100, coupling 102 also may include operatively coupling a skin 44 to the second side 42 of the micro-lattice structure 26.

In some methods 100, prior to the coupling 102, an adherence structure 46 may be bonded to the micro-lattice structure 26, as indicated at 104.

In some methods 100, after the bonding 104 and prior to the coupling 102, the micro-lattice structure 26 and the adherence structure 46 (when present) may be formed into a predetermined shape, as indicated at 106. As an illustrative, non-exclusive example, the micro-lattice structure 26 and the adherence structure 46 (when present) may be formed into a shape that corresponds to a section of an airframe 12 of an aircraft 10. For example, the micro-lattice structure 26 and adherence structure 46 (when present) may be formed into a shape corresponding to a leading edge 20 of an airfoil 22. Shapes corresponding to other portions or sections of an aircraft 10 also are within the scope of the present disclosure, including (but not limited to) trailing edges 21 of airfoils 22, other portions of airfoils 22, the nose 24, portions of the fuselage of the aircraft 10, portions of vertical stabilizers 23, etc.

When a method 100 includes the step of forming 106, the micro-lattice structure 26 and the adherence structure 46 (when present) may be described as being net-shaped to conform to the curvature of a mating part, by thermal post-curing while in contact with a mold in a predetermined shape.

In some methods 100, the bonding 104 may include a step of placing the micro-lattice structure 26 into a volume, or bath, of UV-curable monomer and adjacent to a mask that is configured to define a predetermined configuration of the adherence structure 46, as indicated at 108. After the placing 108, the UV-curable monomer may be cured to form the adherence structure 46 on the micro-lattice structure 26, as indicated at 110. As an illustrative, non-exclusive example, the UV light may be emitted from a 2,000 Watt mercury arc lamp for 1-10 seconds.

Figure 11:
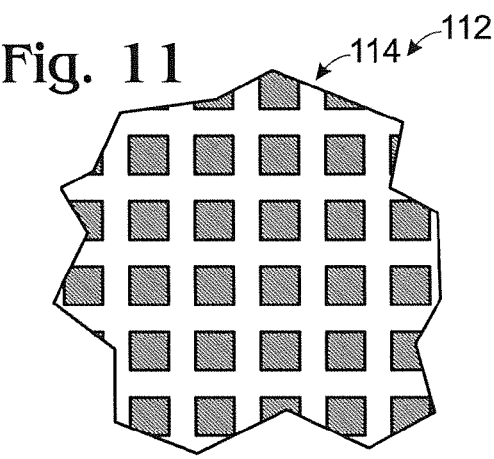
FIG. 11 is a schematic plan view representing illustrative non-exclusive examples of masks that may be used to form an adherence structure on a micro-lattice structure.
Figure 12:
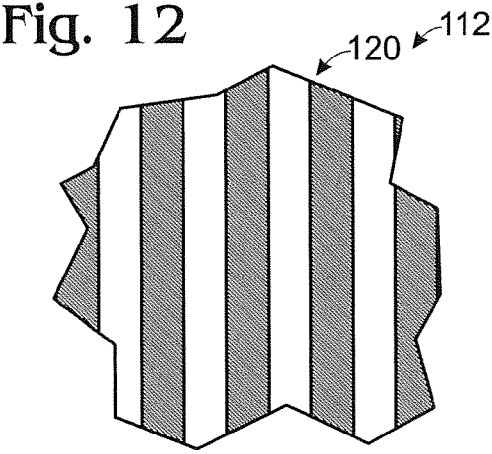
FIG. 12 is another schematic plan view representing illustrative non-exclusive examples of masks that may be used to form an adherence structure on a micro-lattice structure.

FIGS. 11-12 schematically represent illustrative, non-exclusive examples of suitable masks 112 that may be used during the bonding 104 of an adherence structure 46 to a micro-lattice structure 26. In FIG. 11, the regular two-dimensional pattern of squares 114 represent portions of a mask 112, through which ultraviolet (UV) light will not penetrate. Accordingly, when the UV-curable monomer 116 is exposed to UV light 118, as schematically illustrated in FIG. 13, the UV light 118 will cure the portions of the UV-curable monomer 116 that are not blocked by the squares, resulting in an adherence structure 46 and adherence surface 48 that defines a grid 56. The UV-curable monomer 116 that was not exposed to the UV light 118 and thus that was not cured, then may be rinsed away by a solvent, such as in a toluene bath. Any residual solvent may be removed with heat, such as in an 85 degree Celsius oven for approximately two hours.

In FIG. 12, the regular two-dimensional pattern of elongate strips 120 represent portions of a mask 112, through which UV light will not penetrate. Accordingly, when the UV-curable monomer 116 is exposed to UV light 118, the UV light 118 will cure the portions of the UV-curable monomer 116 that are not blocked by the strips, resulting in an adherence structure 46 and an adherence surface 48 that defines a plurality of spaced-apart elongate strips. The UV-curable monomer 116 that was not exposed to the UV light 118 and thus that was not cured, then may be rinsed away as discussed above.

When utilizing an embodiment of micro-lattice structure 26 that includes first-side nodes 50 and/or second-side nodes 52 and when utilizing the mask 112 of FIG. 11 to create a grid 56, during the placing 108, the first-nodes 50 or the second-side nodes 52 may be aligned between four adjacent corners of the squares 114, so that the adherence structure 46 will interconnect the first-side nodes 50 or second-side nodes 52. Similarly, when utilizing an embodiment of micro-lattice structure 26 that includes first-side nodes 50 and/or second-side nodes 52 and when utilizing the mask 112 of FIG. 12 to create an adherence structure 46 and adherence surface 48 that defines a series of spaced-apart elongate strips, during the placing 108, the first-nodes 50 or the second-side nodes 52 may be aligned to coincide between the elongate strips 120 of the mask 112, so that the adherence structure 46 will interconnect linear series of first-side nodes 50 or second-side nodes 52.

Other configurations of masks 112 are within the scope of the present disclosure and may be used in connection with an optional bonding step 104 of a method 100.

With reference to FIG. 14, in some methods 100, the bonding 104 may additionally or alternatively include a step of placing the micro-lattice structure 26 on top of a mold 122, with the mold 122 defining a series of channels 124. The series of channels 124 may define a grid, a series of spaced-apart elongate channels, or any other suitable configuration corresponding to a desired configuration of adherence structure 46. Accordingly, the first-side nodes 50 of the micro-lattice structure 26 may be appropriately aligned with the channels 124 during the bonding 104. Next or prior to the placing of the micro-lattice structure 26 on top of the mold 122, the series of channels 124 may be filed with a volume of UV-curable monomer 116, which may be cured during the curing step 110, such as by utilizing UV light. As schematically indicated in FIG. 14, one or more channels 124 may include one or more bores 126 extending from the channels 124, with the bores 126 being configured to form optional spaced-apart projections 54.

FIG. 10 also schematically represents illustrative, non-exclusive examples of methods 200 of assembling an aircraft 10. Methods 200 may include a method 100, and after a method 100, a method 200 may further include assembling the aircraft 10 utilizing a ventilated aero-structure 16, as indicated at 202.

The apparatuses and methods disclosed herein may find application outside of aircraft, including (but not limited to) boat hulls, antennas, spacecraft, satellites, and any other apparatuses that include energy absorbing structures, such as that typically include honeycomb core structures. Accordingly, where applicable, the term "structure 16" may be used in place of the term "ventilated aero-structure 16" herein.

Illustrative, non-exclusive examples of inventive subject matter according to the present disclosure are described in the following enumerated paragraphs:

A. A ventilated aero-structure, comprising:
a micro-lattice structure having a first side and a second side, wherein the micro-lattice structure includes a plurality of truss elements, and wherein the plurality of truss elements define a plurality of nodes at intersections of two or more truss elements; and
a honeycomb core operatively coupled to the first side of the micro-lattice structure, wherein the honeycomb core includes a plurality of walls that define a plurality of elongate cells, and optionally wherein the elongate cells are hexagonal in cross-section;
wherein an interface between the honeycomb core and the micro-lattice structure is configured to permit air flow to and from the honeycomb core via the micro-lattice structure.

A1 The ventilated aero-structure of paragraph A, further comprising:
an adherence structure formed on the first side of the micro-lattice structure, wherein the adherence structure defines an adherence surface that is adhered to the honeycomb core.

A1.1 The ventilated aero-structure of paragraph A1,
wherein a subset of the plurality of nodes coincide with the first side of the micro-lattice structure and define a plurality of first-side nodes; and
wherein the adherence structure interconnects at least a subset of the plurality of first-side nodes.

A1.1.1 The ventilated aero-structure of paragraph A1.1, wherein the adherence surface defines a grid.

A1.1.2 The ventilated aero-structure of any of paragraphs A1.1-A1.1.1,
wherein the adherence surface defines a plurality of spaced-apart elongate strips.

A1.1.3 The ventilated aero-structure of any of paragraphs A1.1-A1.1.2,
wherein the adherence surface is defined by a plurality of spaced-apart surfaces, wherein each of the plurality of spaced-apart surfaces interconnects a subset of the plurality of first-side nodes.

A1.2 The ventilated aero-structure of any of paragraphs A1-A1.1.3,
wherein the adherence structure is comprised of a polymer, and optionally a polymer formed from a UV-curable monomer.

A1.3 The ventilated aero-structure of any of paragraph A1-A1.2,
wherein the honeycomb core is further operatively coupled to the second side of the micro-lattice structure;
wherein the adherence structure is a first adherence structure and the adherence surface is a first adherence surface; and
wherein the ventilated aero-structure further comprises:
a second adherence structure formed on the second side of the micro-lattice structure, wherein the second adherence structure defines a second adherence surface on the second side that is adhered to the honeycomb core.

A1.3.1 The ventilated aero-structure of paragraph A1.3,
wherein a second subset of the plurality of nodes coincide with the second side of the micro-lattice structure and define a plurality of second-side nodes; and
wherein the second adherence structure interconnects at least a subset of the plurality of second-side nodes.

A1.3.1.1 The ventilated aero-structure of paragraph A1.3.1,
wherein the second adherence surface defines a grid.

A1.3.1.2 The ventilated aero-structure of any of paragraphs A1.3.1-A1.3.1.1,
wherein the second adherence surface defines a plurality of spaced-apart elongate strips.

A1.3.1.3 The ventilated aero-structure of any of paragraphs A1.3.1-A1.3.1.2,
wherein the second adherence surface is defined by a plurality of spaced-apart second-side surfaces, wherein each of the plurality of spaced-apart second-side surface interconnects a subset of the plurality of second-side nodes.

A1.3.2 The ventilated aero-structure of any of paragraphs A1.3-A1.3.1.2,
wherein the second adherence structure is comprised of a polymer, and optionally a polymer formed from a UV-curable monomer.

A1.4 The ventilated aero-structure of any of paragraphs A1-A1.2, further comprising:
a skin operatively coupled to the second side of the micro-lattice structure.

A2 The ventilated aero-structure of any of paragraphs A-A1.4, further comprising:
a plurality of spaced-apart projections extending from the micro-lattice structure into at least a subset of the elongate cells of the honeycomb core, and optionally wherein the plurality of spaced-apart projections are adhered to at least a subset of the walls that define the elongate cells.

A2.1 The ventilated aero-structure of paragraph A2, wherein the plurality of spaced-apart projections includes subsets of three spaced-apart projections extending into respective elongate cells of the honeycomb core.

B An aircraft, comprising:
an airframe, wherein the airframe includes the ventilated aero-structure of any of paragraphs A-A2.1; and
a ventilation system operatively supported by the airframe and configured to circulate air through the ventilated aero-structure.

B1 The aircraft of paragraph B,
wherein the ventilated aero-structure defines at least a leading edge of an airfoil of the aircraft.

C A method of constructing a ventilated aero-structure, the method comprising:
coupling a micro-lattice structure to a honeycomb core to define a portion of an airframe of an aircraft.

C1 The method of paragraph C, further comprising:
prior to the coupling, bonding an adherence structure to a first side of a micro-lattice structure;
wherein the coupling includes adhering the adherence structure to the honeycomb core.

C2 The method of any of paragraphs C-C1, further comprising:
after the bonding and prior to the coupling, forming the micro-lattice structure and adherence structure into a predetermined shape.

C2.1 The method of paragraph C2, wherein the predetermined shape corresponds to a section of the airframe, and optionally a leading edge of an airfoil of the aircraft.

C3 The method of any of paragraphs C-C2.1,
wherein the bonding includes:
placing the micro-lattice structure in a volume of UV-curable monomer adjacent to a mask, wherein the mask is configured to define a predetermined configuration of the adherence structure; and after the placing, curing the UV-curable monomer to form the adherence structure on the micro-lattice structure.

C4 The method of any of paragraphs C-C3, wherein the ventilated aero-structure includes the ventilated aero-structure of any of paragraphs A-A2.1.

D. A method of assembling an aircraft, the method comprising:

utilizing the ventilated aero-structure of any of paragraphs A-A2.1 to define a portion of an airframe of the aircraft.

D1 The method of paragraph D, wherein the ventilated aero-structure defines at least a leading edge of an airfoil of the aircraft.

D2 The method of any of paragraphs D-D1, further comprising:

prior to the utilizing, performing the method of any of paragraphs C-C3.

As used herein, the term "configured" means that the element, component, or other subject matter is designed and/or intended to perform a given function. Thus, the use of the term "configured" should not be construed to mean that a given element, component, or other subject matter is simply "capable of performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being configured to perform a particular function may additionally or alternatively be described as being adapted to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A ventilated aero-structure, comprising:
a micro-lattice structure having a first side and a second side, wherein the micro-lattice structure includes a plurality of truss elements, and wherein the plurality of truss elements define a plurality of nodes at intersections of two or more truss elements;
a honeycomb core operatively coupled to the first side and the second side of the micro-lattice structure, wherein the honeycomb core includes a plurality of walls that define a plurality of elongate cells;
a first adherence structure formed on the first side of the micro-lattice structure, wherein the first adherence structure defines a first adherence surface that is adhered to the honeycomb core; and
a second adherence structure formed on the second side of the micro-lattice structure, wherein the second adherence structure defines a second adherence surface on the second side that is adhered to the honeycomb core;
wherein an interface between the honeycomb core and the micro-lattice structure is configured to permit air flow to and from the honeycomb core via the micro-lattice structure.

2. The ventilated aero-structure of claim 1,
wherein a subset of the plurality of nodes coincide with the first side of the micro-lattice structure and define a plurality of first-side nodes; and
wherein the first adherence structure interconnects at least a subset of the plurality of first-side nodes.

3. The ventilated aero-structure of claim 2,
wherein the first adherence surface defines a grid.

4. The ventilated aero-structure of claim 2,
wherein the first adherence surface defines a plurality of spaced-apart elongate strips.

5. The ventilated aero-structure of claim 2,
wherein the first adherence surface is defined by a plurality of spaced-apart surfaces, wherein each of the plurality of spaced-apart surfaces interconnects a subset of the plurality of first-side nodes.

6. The ventilated aero-structure of claim 1,
wherein the first adherence structure is comprised of a polymer formed from a UV-curable monomer.

7. The ventilated aero-structure of claim 1,
wherein a second subset of the plurality of nodes coincide with the second side of the micro-lattice structure and define a plurality of second-side nodes; and
wherein the second adherence structure interconnects at least a subset of the plurality of second-side nodes.

8. The ventilated aero-structure of claim 7,
wherein the second adherence surface defines a grid.

9. The ventilated aero-structure of claim 7,
wherein the second adherence surface defines a plurality of spaced-apart elongate strips.

10. The ventilated aero-structure of claim 7,
wherein the second adherence surface is defined by a plurality of spaced-apart second-side surfaces, wherein each of the plurality of spaced-apart second-side surface interconnects a subset of the plurality of second-side nodes.

11. The ventilated aero-structure of claim 1,
wherein the second adherence structure is comprised of a polymer formed from a UV-curable monomer.

12. The ventilated aero-structure of claim 1, further comprising:
a plurality of spaced-apart projections extending from the micro-lattice structure into at least a subset of the elongate cells of the honeycomb core.

13. The ventilated aero-structure of claim 1, wherein the micro-lattice structure has a three-dimensional open-cellular structure configured to permit air flow transverse to the plurality of elongate cells of the honeycomb core.

14. An aircraft, comprising:
an airframe comprising the ventilated aero-structure of claim 1; and:
a ventilation system operatively supported by the airframe and configured to circulate air through the ventilated aero-structure.

* * * * *